(12) United States Patent
Tang

(10) Patent No.: US 7,031,885 B2
(45) Date of Patent: Apr. 18, 2006

(54) METHOD AND APPARATUS FOR MEASURING ACCURACIES OF FIXED-POINT COMPUTATIONS

(75) Inventor: Ping T. Tang, Hayward, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/608,244

(22) Filed: Jun. 27, 2003

(65) Prior Publication Data

US 2004/0267498 A1 Dec. 30, 2004

(51) Int. Cl.
*G06F 17/18* (2006.01)
*G06F 1/00* (2006.01)

(52) U.S. Cl. .................. 702/189; 706/21; 715/848; 715/860; 719/315; 717/116

(58) Field of Classification Search .............. 702/85, 702/181–182, 185, 186, 188–189; 708/495, 708/505; 706/21; 715/738, 848, 860; 717/116, 717/315; 719/315, 316; 714/33
See application file for complete search history.

(56) References Cited

U.S. PATENT DOCUMENTS 5,717,877 A * 2/1998 Orton et al. ................ 715/860
5,767,854 A * 6/1998 Anwar ....................... 715/848
6,418,424 B1 * 7/2002 Hoffberg et al. ............. 706/21
6,804,818 B1 * 10/2004 Codella et al. ............. 719/315
2004/0205711 A1 * 10/2004 Ishimitsu et al. ........... 717/116

OTHER PUBLICATIONS

Peter D. Welch, "A Fixed-Point Fast Fourier Transform Error Analysis," IEEE Transactions on Audio and Electroacoustics, vol. AU-17, No. 2, pp. 151-157 (Jun. 1969).
CAS Standards Committee of the IEEE Circuits and Systems Society, "IEEE Standard Specifications for the Implementations of 8×8 Inverse Discrete Cosine Transform," Institute of Electrical and Electronics Engineers, Inc., IEEE Std 1180-1990, pp. 7-13 (1991).

* cited by examiner

*Primary Examiner*—Bryan Bui
*Assistant Examiner*—John Le
(74) *Attorney, Agent, or Firm*—Blakely, Sokoloff, Taylor & Zafman LLP

(57) ABSTRACT

Method and apparatus for measuring accuracies of fixed-point computations are described herein. In one embodiment, the exemplary process includes identifying an operation involving a plurality of input values, invoking an object associated with the identified operation, performing the operation via the invoked object, and automatically generating, as a part of the operation via the object, accuracy information associated with the operation for each of the plurality of input values. Other methods and apparatuses are also described.

27 Claims, 11 Drawing Sheets

406

Addition of a Computed Variable

$z_1(x) = Z_1(x) + u_1(x) + e_1(x)$ $z_2(x) = Z_2(x^1) + u_2(x^1) + e_2(x^1)$

— 414

↓

$z_1(x) + z_2(x) = Z_1(x) + Z_2(x^1) + u_1(x)$
$\qquad + u_2(x^1) + e_1(x) + e_2(x^1)$

— 415

↓

$z(y) = Z(y) + u(y) + e(y)$ where $y = x \cup x^1$

— 416

↓

Error Model:

$f_e(t) = f_{e1}(t) * f_{e2}(t)$ $u(t)t = \max_{p+q+r=t} \{u_1(p+q)(p+q) + u_2(q+r)(q+r)\}$ $v(t)t = \max_{p+q+r=t} \{v_1(p+q)(p+q) + v_2(q+r)(q+r)\}$ where $0 \leq p \leq \max ||a||$, $0 \leq q \leq \max ||b||$, and
$\qquad 0 \leq r \leq \max ||c||$ where $x = a \cup b$, $x^1 = b \cup c$

METHOD AND APPARATUS FOR MEASURING ACCURACIES OF FIXED-POINT COMPUTATIONS

FIELD

Embodiments of the invention relate to the field of error measurement of computations; and more specifically, to error measurement of fixed-point computations.

BACKGROUND

Controlling and attenuating computational errors is directly related to the quality of products in many areas, including, telephony, electronic gamming, digital photography and imaging processing. For example, the accuracy of a fast Fourier transform (FFT) routine is directly related to the sound fidelity of reconstructed music or voice, and the accuracy of a discrete cosine transform (DCT) is directly related to the picture quality of a MPEG (motion pictures experts group) video sequence that a specific MPEG player can produce.

Developers of such computational programs often need to access the computational accuracy of their specific implementation. An important class of computation errors are those caused by the underlying computer arithmetic. For example, exact mathematical coefficients required in a transform cannot be represented exactly in the underlying computer arithmetic format, or that the product of two numbers has to be rounded to the underlying computer arithmetic format.

For the computational program related, but not limited to the products alluded to previously, linear transforms are dominant computational kernel. For linear transforms, all computational error can be attributed to those caused by computer arithmetic. Furthermore, fixed-point computer arithmetic is the dominant arithmetic format as hardware often uses an application specific microprocessor or a general purpose integer-based processor, such as Intel Xscale microprocessor. Hence, measurement of computational error of linear transform in fixed point arithmetic are crucial. Traditionally, such error measurements are performed manually or through testing, which require heavy time consuming efforts. In addition, traditional methods can only produce limited error measurements.

BRIEF DESCRIPTION OF THE DRAWINGS

The invention may best be understood by referring to the following description and accompanying drawings that are used to illustrate embodiments of the invention. In the drawings:

FIG. 4D is a block diagram illustrating an embodiment of an exemplary error measurement model for addition.

DETAILED DESCRIPTION

Figure 1:
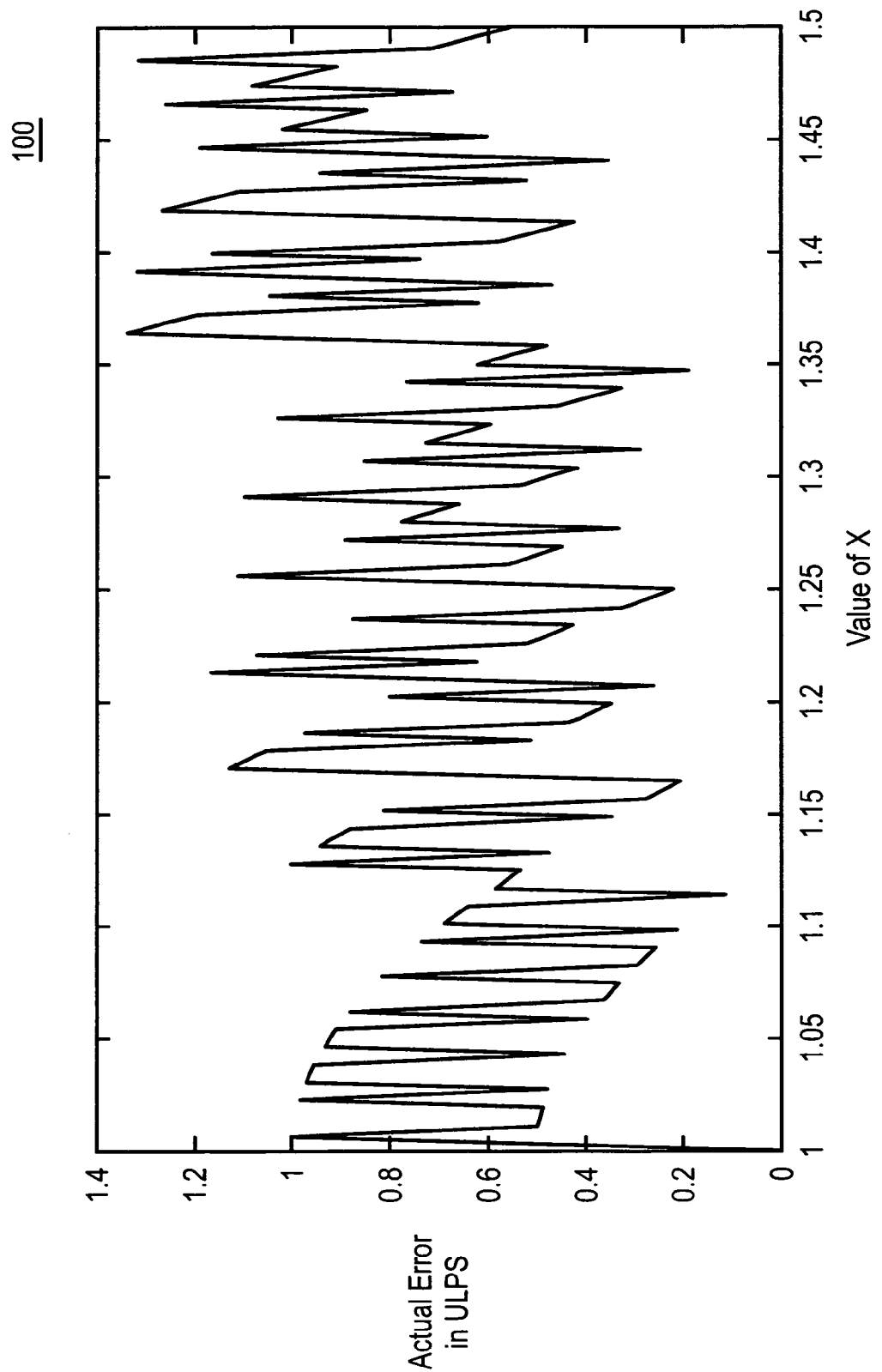
FIG. 1 is a diagram illustrating a plot of typical errors of a computation.

Method and apparatus for measuring accuracies of fixed-point computations are described herein. According to one embodiment, the instrument for measuring the accuracies works for all linear transforms and it does not require the transforms to have any special structures. The instrument produces error measurements in terms of a numerical probability density function. Hence, comprehensive statistical information is captured through a variety of embodiments, including, for example, mean, variance, any moment probability of error falling in arbitrarily defined intervals, and worst-case bounds. The information produced by the instrument pertains to the whole input domain and is mathematically correct conclusions corresponding to a sound model of computational error caused by a fixed-point computer arithmetic. In one embodiment, no manual analysis is required. The instrument acts on an implementation and produces the error measurement automatically.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In general, the error measurement problem deals with a fixed-point implementation of an N-dimensional linear transform T of the form T: $R^N \rightarrow R^M$. There is a need to able to access the difference between the ideal result $(Z_1, Z_2, \ldots, Z_M)$ and the corresponding computed result $(z_1, z_2, \ldots, z_M)$ over all possible input values $(x_1, x_2, \ldots, x_M)$ form an N-dimensional space.

A conventional approach in solving this problem is done through a manual analysis. Typically, a mathematical analysis is performed on a specific transform implemented in a specific way. An upper bound or some statistics about the error of each intermediate computed value is maintained. Thus, such information about the final result is obtained when this process is carried out to the end. Further examples of manual analysis regarding measuring the error can be found in an article entitled "A Fixed Point Fast Fourier Transform Error Analysis", by P. D. Welch, published by IEEE Transaction AU, 17:151–157, June 1969.

However, there are some major drawbacks of this approach. Since the manual analysis can only work with closed-form expressions, the method can be successful only when the transform itself has regular structures. For example, such manual analysis has been applied typically on an FFT (Fast Fourier Transform) algorithm. Other algorithms, such as DCT (Discrete Cosine Transform) may not be applicable. In addition, such manual analysis can only typically obtain an upper bound on the worst case error, and perhaps the mean and variance of the error distribution. Other information may not be practically obtained. Furthermore, the manual analysis requires sophisticated mathematical skill and invokes different analysis for different implementations. A slight modification to an existing implementation would often require a new type of an analysis.

Another conventional approach to solve the problem is through testing. A common form of a testing is described in an IEEE standard on the DCT algorithm, which may be found in the IEEE standard specification for the implementations of 8×8 inversed DCT, ANSI/IEEE Standard 1180–1990, IEEE, 345 East $47^{th}$ Street, New York, N.Y. 10017, USA, 1990. In this approach, typically, a set of randomly chosen test data is taken into the implementation. Independently, the same set of test data is taken through a highly accurate implementation of the same transform. This can be accomplished by any one of many methods of simulation, which may be too slow and unacceptable in some situations.

There are also some drawbacks in this approach. The testing can only yield information about the accuracy of the implementation under test on the set of test data. In practice, testing can only cover an extremely small set of legitimate inputs. Consider, for example, the problem is an 8-length DCT on 16-bit input data. The set of input data has $(2^{16})^8 = 2^{128} \approx 10^{38}$ values. Even testing at a million data points, we are only covering $10^6/10^{38} = 10^{32} = 10^{30}\%$. FIG. 1 illustrates a plot of an actual error on 1000 points of data. Note that plot 100 of FIG. 1 corresponds to only one dimensional transform, which may be achievable using a testing and plotting method. However, for a larger set of data, such as multiple vectors of data, it may be impractical to use the above approaches.

Accordingly, an advanced error measurement instrument is introduced which can provide comprehensive error assessment in an automatic manner. According to one embodiment, the measurement instrument is construed based on three parts: a model of fixed-point computational error components, the operator overloading facility offered by an object oriented programming language, and a mathematical characterization of propagation of error components.

In general, every operation in an implementation of a computer program produces a computed value that contains an ideal value corrupted slightly by an error. A model is defined that categorizes the error into two additive terms. Moreover, for each component, some mathematical functions are defined that capture the comprehensive information regarding the components, including, for example, basic operations, such as addition, multiplication, and shifting operations, etc. According to one embodiment, an object oriented programming languages, such as, C/C++, may be used to implement such operations in a transparent manner. An overloaded operator, such as, for example, "+", "*", or ">>", may be used to automatically produce at the end, not only the normal computed values, but also the associated mathematical functions, such as, probability density and upper bound functions, which may provide the accuracy information regarding the corresponding operation. Based on the error model, one or more propagation functions are defined to perform the basic arithmetic operations between the associated computed values.

Figure 2:
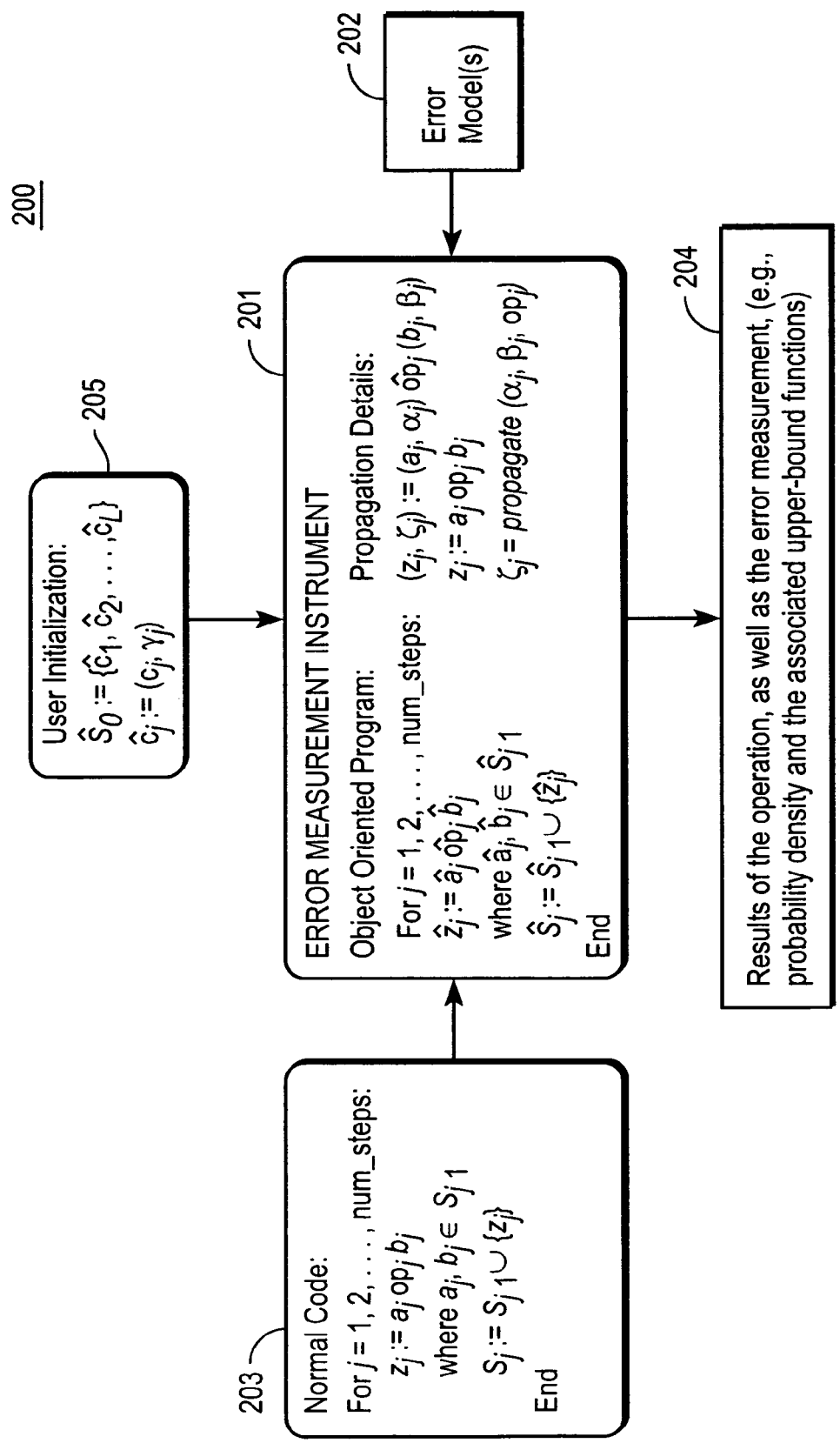
FIG. 2 is a block diagram illustrating an embodiment of an exemplary error measurement system.

FIG. 2 is a block diagram illustrating an embodiment of an exemplary error measurement system. In one embodiment, exemplary system 200 includes an error measurement instrument 201 and one or more error models 202 associated with an operation introduced in instructions 203. Error measurement instrument 201 invokes the one or more error models to perform the operation specified by the instructions 203 and produces a result 204 including a normal result of the operation and its associated accuracy information, such as, for example, probability density and one or more upper bound functions of the operation.

Referring to FIG. 2, a computational program implementing a linear transform may be described as a procedure that begins on an initial set of data containing both the input data and a set of coefficients defining the transform (block 205). This set of data may be denoted as:

$$S_0 = \{c_1, c_2, \ldots, c_L\}$$

The computation may be considered as just a sequence of single instruction. Each instruction contains a basic operation drawing on a set of data and produces a new value. The new value is then included into the set of data to be drawn upon by the next instruction. Mathematically, this scenario may be described as:

$$Z_j = a_j \text{ op}_j b_j, a_j, b_j \in S_{j-1}$$

$$S_j = S_{j-1} \cup \{Z_j\}$$

The error measurement technique depends on defining several suitable mathematical functions capturing the error characteristics of the initial data and intermediate computed values. For example, if the input data is considered as an exact value, the associated error is zero. For the fixed coefficients, the error is known to be the difference between the ideal value (such as $\pi$) and the one represented in the computer program (e.g., the rounding value). In one embodiment, an object is defined and created in a form of:

$$\bullet_j = (c_j, \gamma_j), j=1, 2, \ldots, L$$

Where the $\gamma_j$ is the corresponding mathematical function at a certain stage that captures the information about the associated errors. Note that $\delta_j$ here denotes abstractly all the functions and information used to keep track of error information. It will be appreciated that $\gamma_j$ is not limited to only one function or limited functions. As long as appropriate actions can be defined on the error information capturing functions for each of the operation $\text{op}_j$, a simple program may be implemented in an object-oriented environment as illustrated in FIG. 2.

Figure 3:
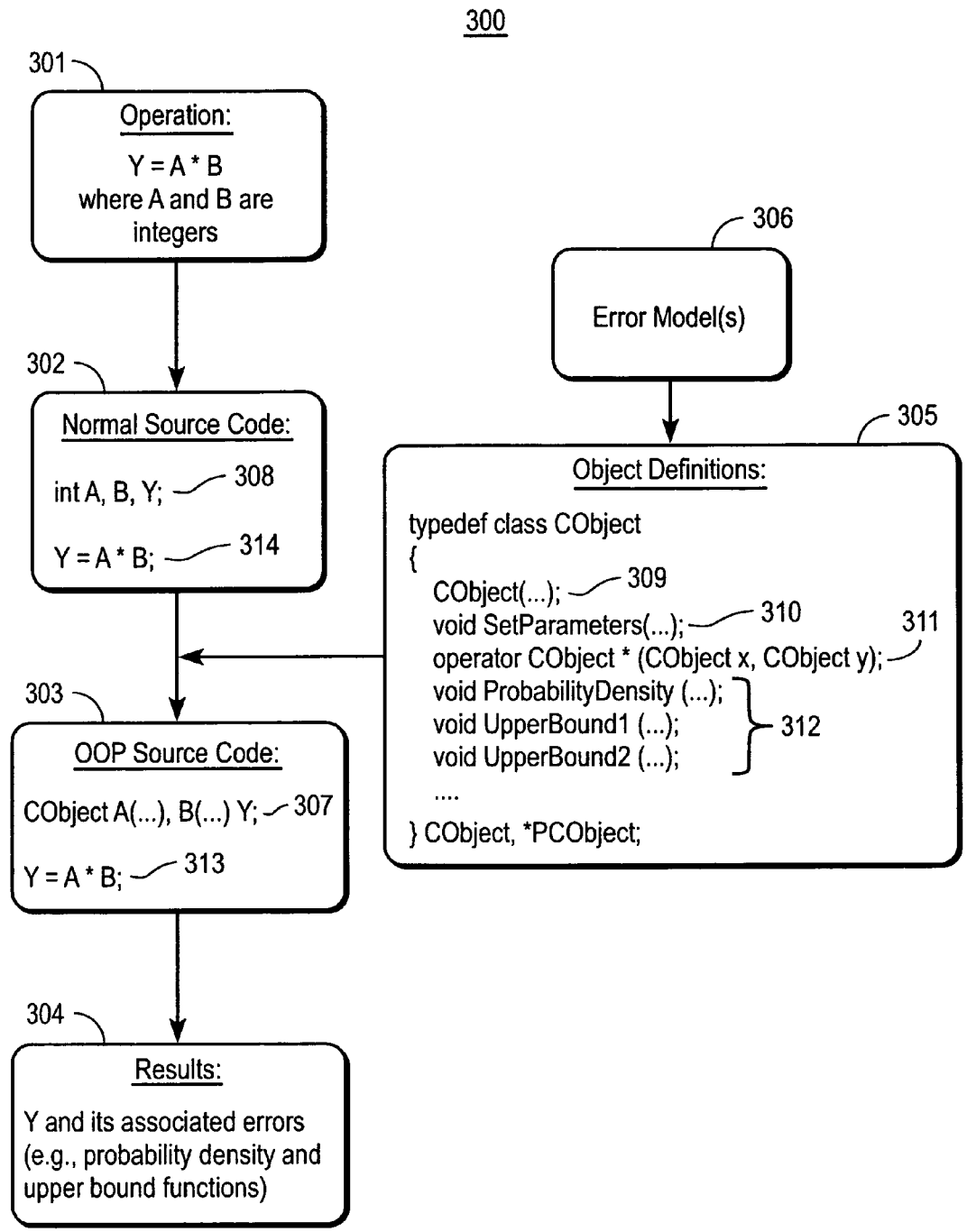
FIG. 3 is a block diagram illustrating another embodiment of an exemplary error measurement system.

FIG. 3 is a block diagram illustrating an embodiment of an exemplary implementation of an error measurement system. In this embodiment, exemplary system 300 is implemented in C/C++ object-oriented programming (OOP) language. It will be appreciated that other OOP languages may be utilized. The processes involved in system 300 may be implemented by a processing logic that may comprise hardware (circuitry, dedicated logic, etc.), software (such as is run on a general purpose computer system or a dedicated machine), or a combination of both.

Referring to FIG. 3, for an operation provided at block 301, a normal C/C++ source code to implement the operation is illustrated at block 302. In this example, the operation involved is a multiplication "*". At block 303, an object 305 which is designed for the operation is invoked. Note that such invocation only reflects minor changes, from statement 308 to statement 307, at the source code level and the underlying operation is performed transparently to a user or a developer. The results 304 includes a normal result of the operation, as well as corresponding errors for the operation, including, but not limited to, the probability density and one or more upper bound functions.

In one embodiment, object 305 includes one or more propagation member functions 312 to perform the error measurements. In addition, the operator "*" involved in the operation is overloaded in statement 311. Note that, the operators involved in blocks 302 and 303 are different. Operator "*" in operation 314 is a simple multiplication. Operator "*" in operation 313 is an overloaded operator which not only performs the multiplication similar to operation 314, but also includes the error measurements associated with the operation. When object 305 is invoked in statement 307, the corresponding parameters, such as input values and the associated coefficients may be initialized through the constructor 309. Alternatively, they may be initialized through a dedicated member function, such as function 310. The propagation member functions 312 may invoke one or more error models 306 associated with the operation, which will be described in details further below. Other features apparent to one with ordinary skill in the art may be included in object 305.

Figure 4A:
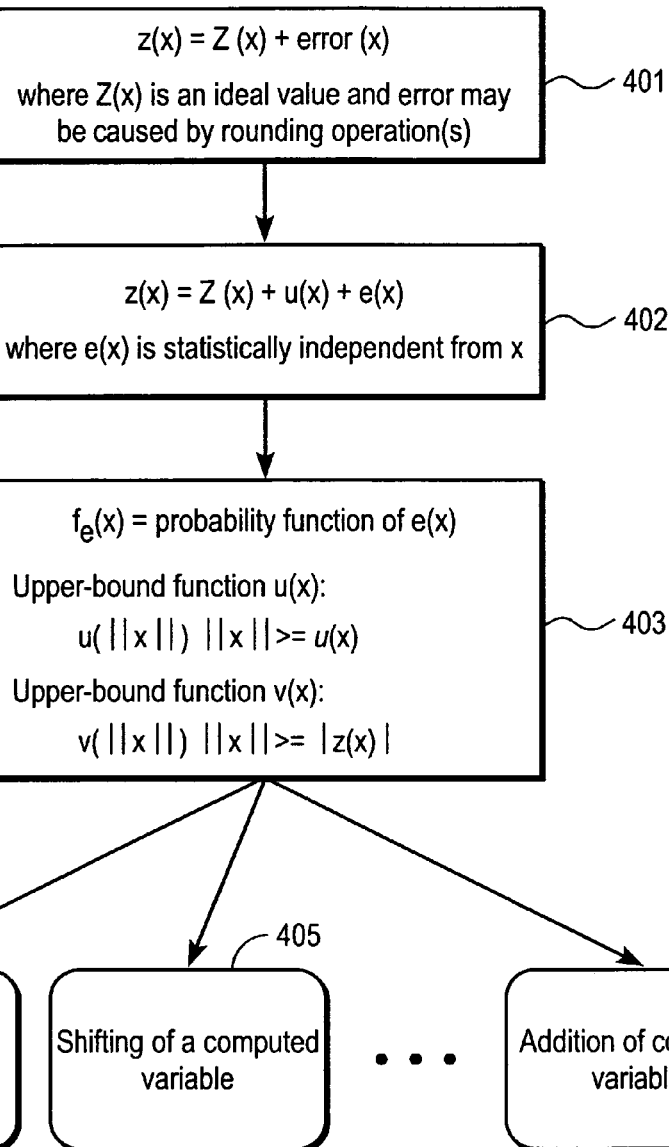
FIG. 4A is a block diagram illustrating an embodiment of an exemplary error measurement model.

As discussed above, an error model associated with the operation plays an important role in the error measurements. FIG. 4A is a block diagram of an embodiment of en exemplary error model. The processes involved in exemplary error model 400 may be implemented by a processing logic that may comprise hardware (circuitry, dedicated logic, etc.), software (such as is run on a general purpose computer system or a dedicated machine), or a combination of both.

As shown in block 401, given an N-dimensional linear transform, every intermediate computed value z is dependent upon a subset of the N input variables. In addition, z also corresponds to an ideal value Z which is the value obtained if all coefficients were exact and no arithmetic error was introduced during z's computation. Thus, an additive model of error may be described, as shown in block 401, as follows:

$$z(x) = Z(x) + \text{error}(x)$$

Note that x may be a vector containing all input variables that affect the intermediate value z in question. Thus, x does not necessarily contain all N input variables. Function error(x) is a random variable. Here, the additive model of this error function is used to separate its part that is statistically independent of the random variable x. As a result, as shown in block 402, the model may be described as:

$$z(x) = Z(x) + \mu(x) + \epsilon(x)$$

where $\epsilon(x)$ is statistically independent from x. Note that as functions, $\mu(x)$ and $\epsilon(x)$ are real-valued but with domains that are high dimensional.

Given this model, according to one embodiment, as shown in block 403, three functions may be defined, which may be used to encapsulate a comprehensive set of information regarding the errors. Since $\epsilon(x)$ is statistically independent from x, a probability density function $f_\epsilon$ is defined as follows:

$$f_\epsilon = \text{probability density function of } \epsilon(x)$$

Where the probability density function is a function, such that:

$$\text{Probability that } a \cdot \epsilon(x) \cdot b = \int_a^b f_\epsilon(t) dt$$

For $\mu(x)$, according to one embodiment, an upper bound function in terms of the norm of x may be defined as follows:

$$u(\|x\|) \|x\| \geq \mu(x)$$

In addition, according to one embodiment, another upper bound function associated with the computed value may be defined as follows:

$$v(\|x\|) \|x\| \geq |z(x)|$$

The above functions are real-valued and one dimensional (e.g., scalar). Thus, these functions can be represented in a computer program using any of the methods that is well known in the art. According to one embodiment, these functions can be represented through dense samples of domain and function values.

In one embodiment, the initial set of data includes input variables $x_j$, $j=1, 2, \ldots, N$ for N-dimensional linear transform, and a number of coefficients. Considering an input variable $x_j$, typically, it is considered error free. In this case, the probability density function of each input variables are thus the point mass concentrated at zero. Using the usual symbol $\delta$ for a delta function (e.g., a point mass), the $f_\epsilon$ component may be initialized as:

$$f_\epsilon(t)=\delta(t)$$

The upper bound functions may be defined as follows:

$$u(t)=0, \text{ for } t\in[0, \max |x_j|]$$

and $$v(t)=1, \text{ for } t\in[0, \max |x_j|]$$

For the coefficients, a typical scenario is that the coefficient w stored in an implementation (e.g., a computer program) is one obtained from rounding an mathematical value $\omega$, thus w may be defined as follows:

$$w=\omega+\alpha$$

where $\alpha$ is an absolute error. This error can be computed relatively accurately and this, the initialization takes a form of:

$$f_\epsilon(t)=\delta(t-\alpha)$$

As described above, the probability density function of the error of the coefficient is the point mass concentrated at $\alpha$. In other words, with probability of 1, the error is $\alpha$. The upper bound function u may be initialized as:

$$u(t)=0$$

since there is no input variable data dependent error. There is no need for an initialization for function $v(t)$ for the coefficients.

Note that if the input variables of the linear transforms are output variables of another linear transform instrumented by this error measurement instrument, there is no need for explicit initialization as the error capturing functions are already calculated.

Following is an explanation of the computation of exemplary upper bound functions, according to one embodiment. Consider a situation where there are real input variables x1, x2, x3, each in the range [0, 1]. Suppose the computation software contains following operations:

$$Y1=x1+x2;$$

$$Y2=x1+x3;$$

$$Z=Y1+Y2;$$

Let us consider the upper bound function related to the intermediate variables Y1, Y2, and Z. The upper bound functions for the input variables are the simple constant function 1. That is, upper bound function $U\_x1(t)$ for x1 may be defined:

$$U\_x1(t)=1, \text{ for } 0<=t<=\max\_norm(x1)=\max|x1|=1$$

where $U\_x1(t)=1$ on $[0, 1]$. By that we mean $|x1|<=U\_x1(\|x1\|)*\|x1\|$ for all values of x1, because the norm $\|\ \|$ is 1-norm, $\|x1\|$ by definition is $|x1|$ and $|x1|<=1*|x1|$. The upper bound function $U\_x2(t)$ for x2, and $U\_x3$ for x3 are both of the same form.

Now, let us consider what happens to Y1. First, Y1 depends on the input variables x1 and x2. Thus, Y1 is a function of $x12=(x1, x2)$. $\|x\|$ by definition is $\|x12\|=|x1|+|x2|$. The range of the norm of the input to Y1 is thus from 0 to $2.0<=\|x12\|<=2$. Now, we need to find an upper bound function $U\_Y1(t)$ such that $|Y1(x\_12)|<=U\_Y1(\|x\_12\|)$ $\|x\_12\|$ for all possible values of $x\_12=(x1, x2)$. That is, we need to find a function:

$$U\_Y1(\|x\_12\|)>=|Y1(x\_12)|/\|x\_12\| \text{ for all } \|x\_12\|>0.$$

For $\|x\_12\|=0$, we simply define $U\_Y1(0)=0$. Now, $Y1=x1+x2$ and each of x1 and x2 has an upper bound function. Thus:

$$|Y1(x\_12)|<=U\_x1(\|x1\|)\|x1\|+U\_x2(\|x2\|)\|x2\| \text{ where } x\_12=(x1, x2).$$

$$|Y1(x\_12)|<=U\_x1(\|x1\|)\|x1\|/\|x12\|+U\_x2(\|x2\|)\|x2\|/\|x12\|$$

For simplicity, a special situation is used here that $U\_x1$ and $U\_x2$ are 1, such that:

$$|Y1(x\_12)|<=\|x1\|/\|x12\|+\|x2\|/\|x12\|$$

Thus, we if can find a function $U\_Y1(t) 0<=t<=\max\_norm(x12)=\max\_norm(x1)+\max\_norm(x2)=2$, such that:

$$U\_Y1(\|x12\|)>=\|x1\|/\|x12\|+\|x2\|/\|x12\| \text{ for all } \|x12\|$$

that is $$U\_Y1(t)>=\|x1\|/t+\|x2\|/t \text{ for all } \|(x1,x2)\|=t.$$

By definition, $\|x12\|=|x1|+|x2|$. Thus, $\|x12\|$ can be 1 for a variety of possible values of x1 and x2, such as $(x1,x2)=(\frac{1}{2}, \frac{1}{2})$, or $(x1,x2)=(0,1)$, or $(x1,x2)=(\frac{1}{3}, \frac{2}{3})$, etc. In order for:

$$U\_Y1(t)>=\|x1\|/t+\|x2\|/t \text{ for all } \|(x1,x2)\|=t,$$

we must find, for each t in [0,2] the maximum possible value on the right hand side subject to the requirement of $|x1|+|x2|=t$. Therefore, we may define:

$$U\_Y1(1) = \max\_\{|x1| + |x2| = 1\} |x1|/1 + |x2|/1$$
$$= \max\_\{|x1| + |x2| = 1\} (|x1| + |x2|) = 1.$$

Similarly, $$U\_Y1(\tfrac{1}{2})=\max\_\{|x1|+|x2|=\tfrac{1}{2}\}|x1|/0.5+|x2|/0.5=1$$

As a result, we can define $U\_Y1(t)=1$, for t in [0,2]. Similarly, $U\_Y2(t)=1$ for t in [0,2]. Finally, $Z=Y1+Y2$ now depends on all the variables x1, x2, x3, as shown in follows:

$$Z(x123)=Y1(x12)+Y2(x13)$$

Note now that $\|x123\|=|x1|+|x2|+|x3|$ is in the range 0 to 3. We wish to find a function $U\_Z(t)$, $0<=t<=3$ such that:

$$U\_Z(t)>=U\_Y1(\|x12\|)\|x12\|/t+U\_Y2(\|x13\|)\|x13\|/t$$

whenever $\|x123\|=t$. $\|x123\|=t$ does not mean that $\|x12\|+\|x13\|=t$ because x12 and x13 shares a common input variable. Thus, we need to find a function, such as:

$$U\_Z(t)>=\|x12\|/t+\|x13\|/t, \text{ for all } 0<=t<=3$$

For example, at t=1, we need to find a value, such as:

$$U\_Z(1) >= (|x1|+|x2|)/1 + (|x1|+|x3|)/1, \text{ where } |x1|+|x2|+|x3|=1$$

The numerical strategy to find this value is to maximize the right hand side subject to the constraint $|x1|+|x2|+|x3|=1$. This may be done by a simple method of getting many points in this domain of (x1,x2,x3), such as, for example, (1, 0, 0), (0.9, 0.1, 0), (0.9, 0, 0.1), (0.8, 0.2, 0), (0.8, 0.1, 0.1), (0.8, 0, 0.2), etc., and computes the right hand side for each value, and take the maximum of such number. This maximum number is the value we use to define upper bound function U_Z(1). Thus, in general, in order to define U_Z(t), we solve the maximization problem by:

$$\text{Max}\_\{|x1|+|x2|+|x3|=t\}(1/t)\{(|x1|+|x2|)+(|x2|+|x3|)\}$$

According to one embodiment, a general situation may be described as follows. In this situation, we have two upper bound functions $U\_1(\|xvec\_1\|)$ and $U\_2(\|xvec\_2\|)$. Where xvec_1 and xvec_2 will in general share some common variables. For example, xvec_1=(x1, x3, x5, x6) and xvec_2=(x1, x6, x8). The new upper bound function to be defined has input variables equal to the "union" of these two lists: xvec_union=(x1, x3, x5, x6, x8). We need:

$$U\_\text{new}(\|xvec\_\text{union}\|) >= U\_1(\|xvec\_1\|)\|xvec\_1\|/\|xvec\_\text{union}\| + U\_2(\|xvec\_2\|)\|xvec\_2\|/\|xvec\_\text{union}\|$$

Note that:

$$\|xvec\_1\| = |x1|+|x3|+|x5|+|x6| = \|(x3,x5)\| + \|(x1,x6)\|$$

$$\|xvec\_2\| = |x1|+|x6|+|x8| = \|(x8)\| + \|(x1,x6)\|$$

and $$\|xvec\_\text{union}\| = \|(x3,x5)\| + \|(x1,x6)\| + \|(x8)\|$$

For two upper bound functions, we can always separate the list of union variables into three groups. One group is common to both, each of the other two is unique to one of the functions. The total norm is the sum of these three norms.

Therefore, if we denote $p=\|(x3,x5)\|$ (unique to U_1), $q=\|(x1,x6)\|$(common), $r=\|(x8)\|$ (unique to U_2), the maximization problem we need to solve is, for each t in 0 to max $\|xvec\_\text{union}\|$:

$$\max\_\{p+q+r=t\}\{U\_1(p+q)*(p+q)/t + U\_2(q+r)*(q+r)/t\}$$

Again, the method is simply to generate many sample points (p,q,r) such that p+q+r=t and take the maximum value achieved on the right hand side. Note that the above processes are illustrated as an example for the purposes of illustration. It will be appreciated that other optimization methods may be utilized.

Referring back to FIG. 4A, typically, according to one embodiment, operations often used in computations are multiplication 404 of a computed variable by a coefficient, shifting of an intermediate value 405 (e.g., a right shifting operation), and addition 406 of two computed values. In general, there is no multiplication by non-coefficients due to linearity and division of coefficients are realizable as multiplication by the inverse of the coefficients. However, the operations modeled are not limited to the above mentioned operations, it will be appreciated that the error model approach may be applied to other operations apparent to one with ordinary skill in the art.

Figure 4B:
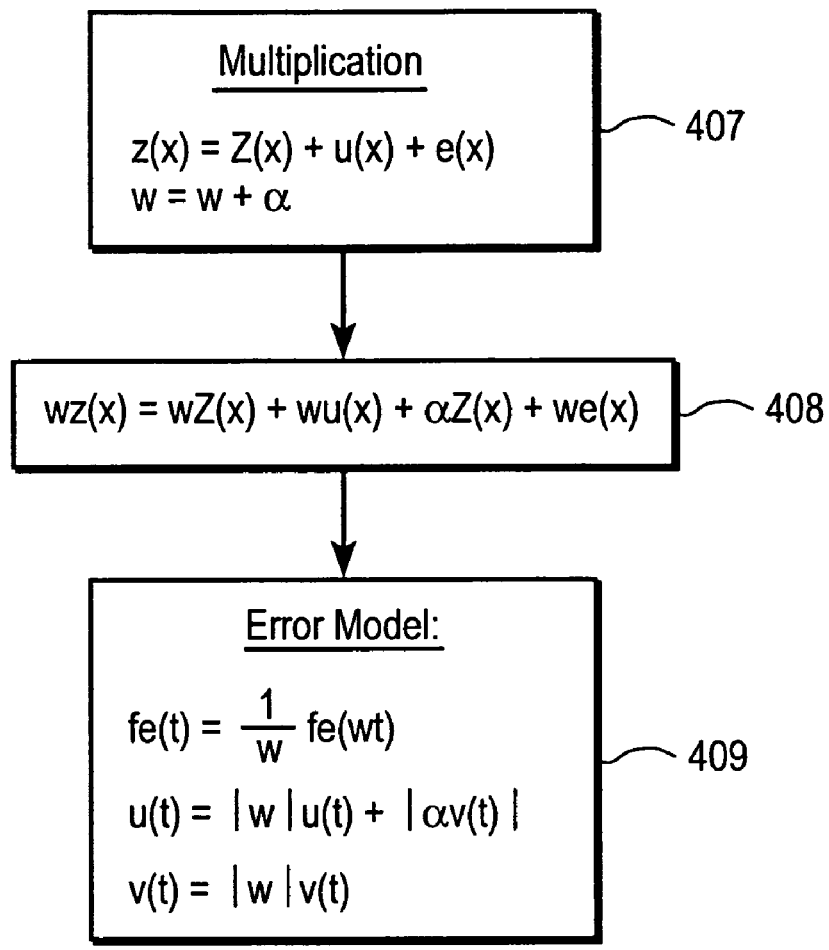
FIG. 4B is a block diagram illustrating an embodiment of an exemplary error measurement model for multiplication.

FIG. 4B is a block diagram illustrating an embodiment of an exemplary multiplication error model. The processes involved in exemplary error model 404 may be implemented by a processing logic that may comprise hardware (circuitry, dedicated logic, etc.), software (such as is run on a general purpose computer system or a dedicated machine), or a combination of both.

Referring to FIG. 4B, according to one embodiment, as shown in block 407, given an intermediate value z and a coefficient w:

$$z(x) = Z(x) + \mu(x) + \epsilon(x)$$

$$w = \omega + \alpha$$

we have, as shown in block 408:

$$wz(x) = \omega Z(x) + w\mu(x) + \alpha Z(x) + w\epsilon(x)$$

Clearly, $w\epsilon(x)$ is the resulting statistically data independent error form. According to one embodiment, the probability density function of wz(x), as shown in block 409, may be defined as:

$$\text{new } f_\epsilon(t) = f_\epsilon(wt)/|w|$$

where $f_\epsilon(t)$ is the density function associated with z(x). The new upper bound functions u(t) and v(t) may be defined as:

$$\text{new } u(t) = |w|u(t) + |\alpha|v(t)$$

and $$\text{new } v(t) = |w|v(t)$$

Figure 4C:
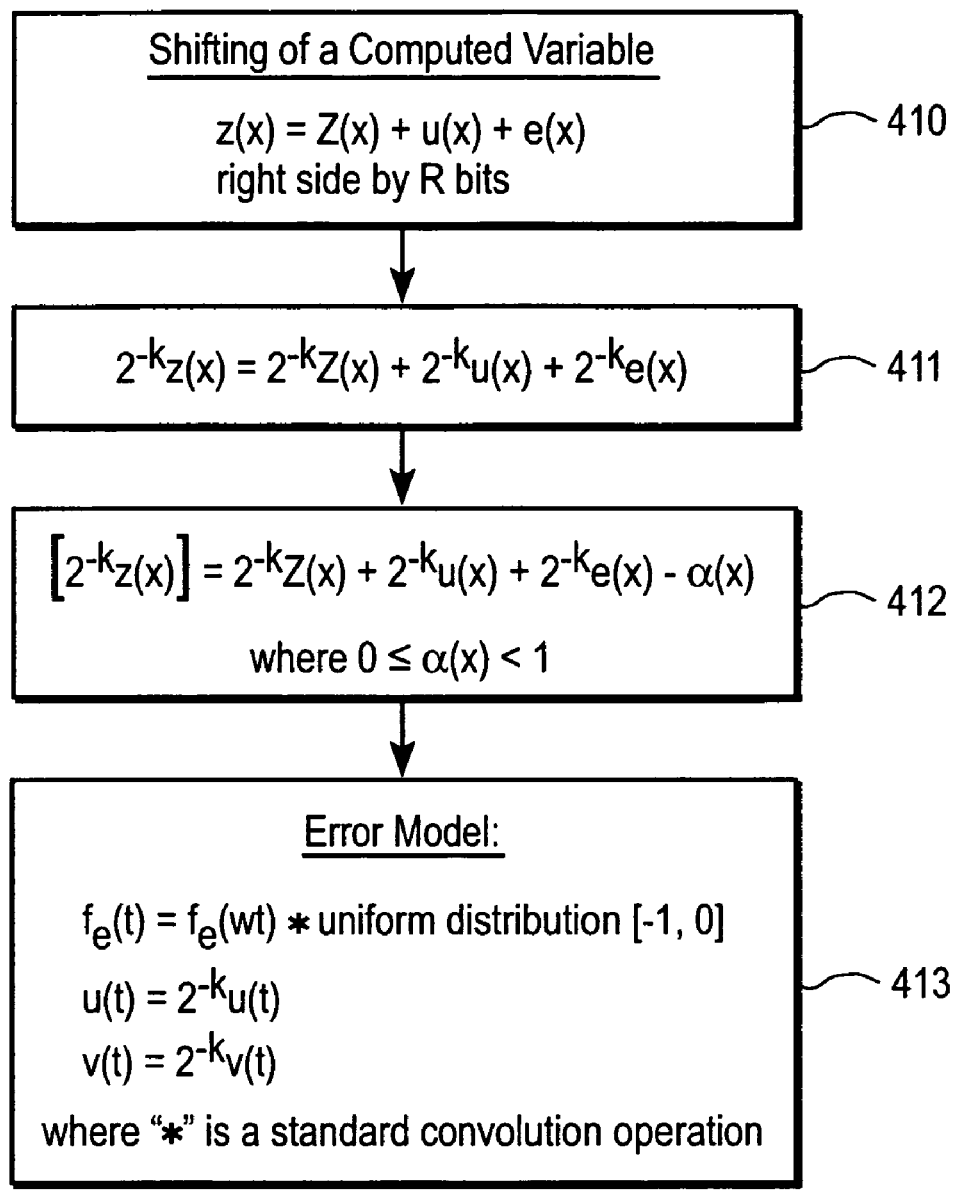
FIG. 4C is a block diagram illustrating an embodiment of an exemplary error measurement model for shifting operation.

FIG. 4C is a block diagram illustrating an embodiment of an exemplary shifting error model. The processes involved in exemplary error model 405 may be implemented by a processing logic that may comprise hardware (circuitry, dedicated logic, etc.), software (such as is run on a general purpose computer system or a dedicated machine), or a combination of both.

Referring to FIG. 4C, when a computed value z is right shifted by k bits, as shown in blocks 410 and 411, this corresponds to multiplication by $2^{-k}$ followed by a truncation:

$$z(x) = Z(x) + \mu(x) + \epsilon(x)$$

$$2^{-k}z(x) = 2^{-k}Z(x) + 2^{-k}\mu(x) + 2^{-k}\epsilon(x)$$

$$\lfloor 2^{-k}z(x) \rfloor = 2^{-k}Z(x) + 2^{-k}\mu(x) + 2^{-k}\epsilon(x) - \alpha(x)$$

where $0 \leq \alpha < 1$. Thus, as shown in block 413, the probability density and upper bound functions may be defined as:

$$\text{new } f_\epsilon(t) = f_\epsilon(wt) * \text{uniform distribution of } [-1, 0]$$

$$\text{new } u(t) = 2^{-k}u(t)$$

$$\text{new } v(t) = 2^{-k}v(t)$$

Here "*" is a standard convolution operation well known in the art.

FIG. 4D is a block diagram illustrating an embodiment of an exemplary addition error model. The processes involved in exemplary error model 406 may be implemented by a processing logic that may comprise hardware (circuitry, dedicated logic, etc.), software (such as is run on a general purpose computer system or a dedicated machine), or a combination of both.

Referring to FIG. 4D, as shown in blocks 414 to 416, when two computed values $z_1$ and $z_2$ are added:

$$z_1(x)=Z_1(x)+\mu_1(x)+\epsilon_1(x)$$

$$z_2(x)=Z_2(x')+\mu_2(x')+\epsilon_2(x')$$

$$z_1(x)+Z_2(x)=Z_1(x)+Z_2(x')+\mu_1(x)+\mu_2(x')+\epsilon_1(x)+\epsilon_2(x')$$

$$z(y)=Z(y)+\mu(y)+\epsilon(y), \text{ where } y=x \cup x'$$

The error component that is statistically independent is the sum of the two $\epsilon$ terms. According to one embodiment, the probability density function of the data independent error of the sum z, as shown in block 417, may be defined as:

$$\text{new } f_\epsilon(t)=f_{\epsilon 1}(t)*f_{\epsilon 2}(t)$$

The new upper bound function for the data independent error must satisfy:

$$\text{new } u(t)t \geq |\mu_1(x)|+|\mu_2(x')| \text{ for all } \|y\|=\|x \cup x'\|=t$$

This is satisfied as long as:

$$\text{new } u(t)t \geq u\mathbf{1}(r)r+u\mathbf{2}(s)s, \text{ for } \|x \cup x'\|=t \text{ and } \|x\|=r, \|x'\|=s$$

The new u function may be obtained by separating two sets of input variables x and x' into three disjoint sets a, b, and c, where:

$$x=a \cup b,\ x'=b \cup c$$

The u function may be obtained as follows:

$$u(t)t \geq \max_{p+q+r=t}\{u_1(p+q)(p+q)+u_2(q+r)(q+r)\}$$

where $0 \leq p \leq \max \|a\|$, $0 \leq q \leq \max \|b\|$, and $0 < r < \max \|c\|$. Similarly, the v function may be obtained in a similar manner:

$$v(t)t > \max_{p+q+r=t}\{v_1(p+q)(p+q)+v_2(q+r)(q+r)\}$$

where $0 \leq p < \max \|a\|$, $0 \leq q \leq \max \|b\|$, and $0 \leq r \leq \max \|c\|$.

Figure 5:
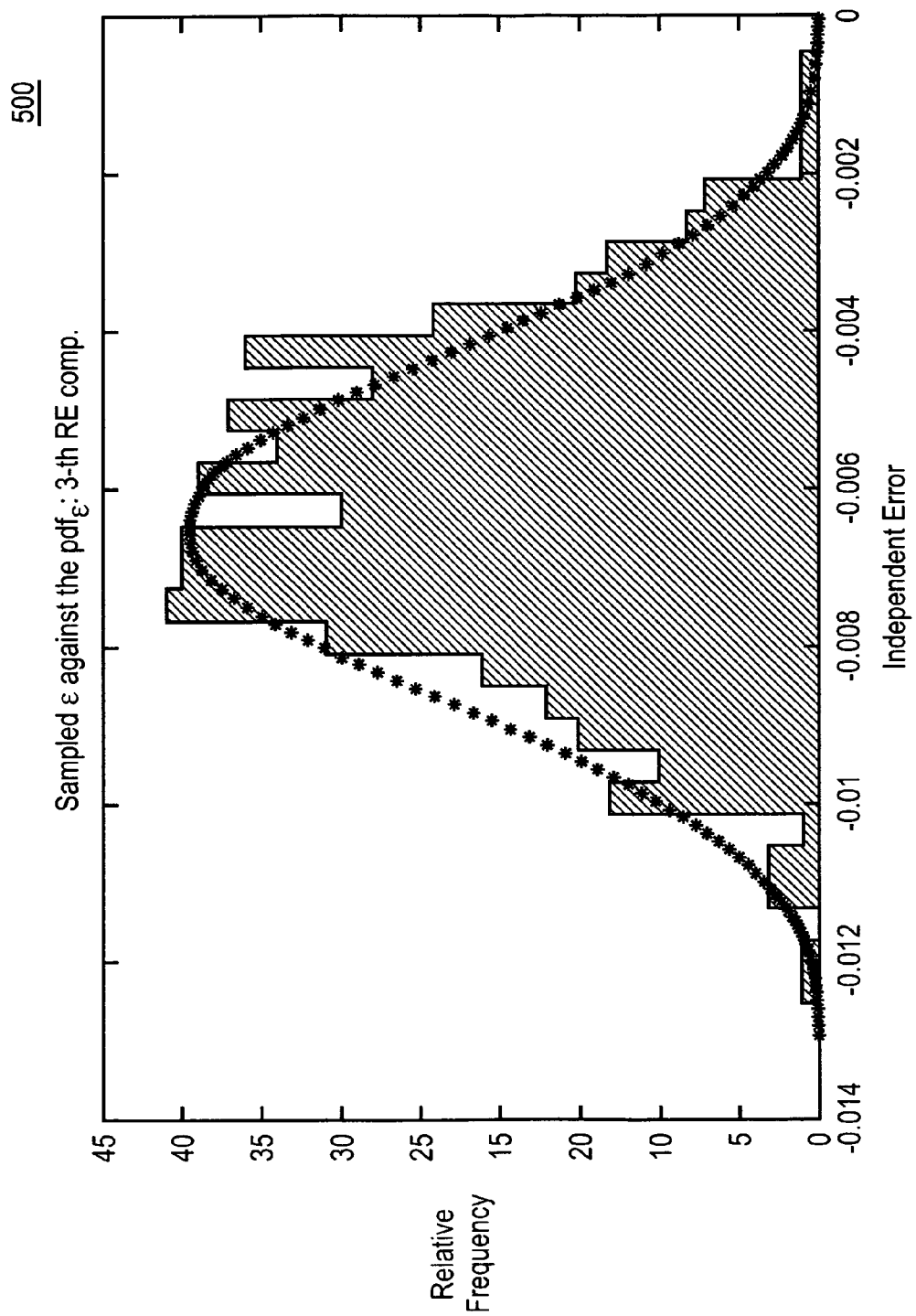
FIG. 5 is a diagram illustrating an embodiment of an exemplary error measurement shown as a probability density function.

FIG. 5 is a diagram illustrating a result of an exemplary probability density function according to one embodiment. This is a report of an FFT operation used to compute a 16-length complex-to-complex transform. Exemplary diagram 500 shows a bell-shape curve (outlined by "***") This is the probability density function associated with the $3^{rd}$ real component of the result. For a 16-length complex-to-complex FFF, there are 16 complex numbers in the result. The density function shows that absolute error that behaves independently from the input data always falls in a range of about −0.013 to 0.

In addition, the average error is about −0.0065. If a user or a developer wants to know the percentage of time this error component is within −0.01 to 0, according to one embodiment, he/she may perform the following calculations: computing the numerical area under the density function (e.g., from 0 to −0.013) and computing the numerical area under the function from −0.01 to 0. The ratio of the second number to the first number is the probability that the $3^{rd}$ component has an error within this range.

For example, for an FFT routine, the input variables are included in a vector of 16 complex numbers, such as x(0), x(1), ..., x(15). Each x(k) is defined as:

$$x(k)=x\_re(k)+sqrt(-1)*x\_im(k)$$

and each of the real and imaginary components is within the range of [−1, 1]. For a specific input vector, there is one computed output vector and there is only one unique perfect answer. Thus, the error is one specific 16-length complex vector. Therefore, the error of the computed $3^{rd}$ real component is a number.

For those data dependent errors, an upper bound function $v(\|x\|)$ is computed and the $v(\|x\|)$ may have a property of:

$$|\text{data dependent error}| \leq v(\|x\|)*\|X\|$$

The x is an input again for the subsequent computations. Other information may be derived from the exemplary diagram 500.

Figure 6:
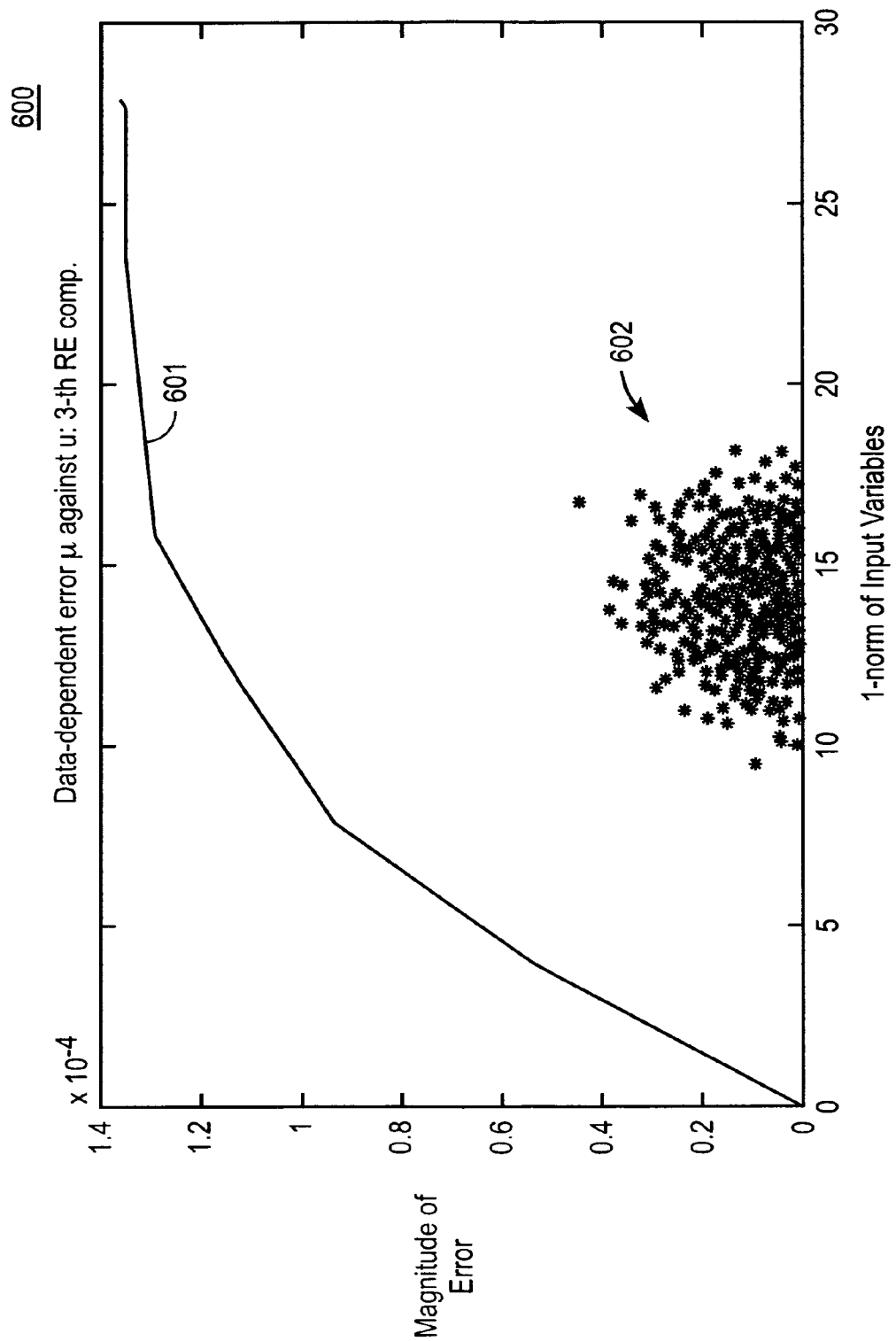
FIG. 6 is a diagram illustrating an embodiment of an exemplary data dependent error.

FIG. 6 is a diagram illustrating an exemplary data dependent errors according to one embodiment. Curve 601 represents an upper bound function $v(\|x\|)*\|x\|$. Referring to FIG. 6, the maximum value reached by the curve 601 is about $1.38*10^{-4}=0.000138$. This is a worst case bound of this component of error. Thus, a worst case error bound on the computed $3^{rd}$ real component is 0.013+0.000138 (e.g., data independent error+data independent error).

In addition, according to one embodiment, there is a lot of information which can be derived. For example, from the diagram 600, there may be 80% of time the data independent error falls in between −0.01 and 0.002. The norm of the input rarely reaches the extreme values. If the input components are independent, the norm follows a normal distribution. Thus, for most of the time, the norm of the input data is between 10 and 20 (e.g., data area 602). Other information may be derived from the exemplary diagram 600.

Figure 7:
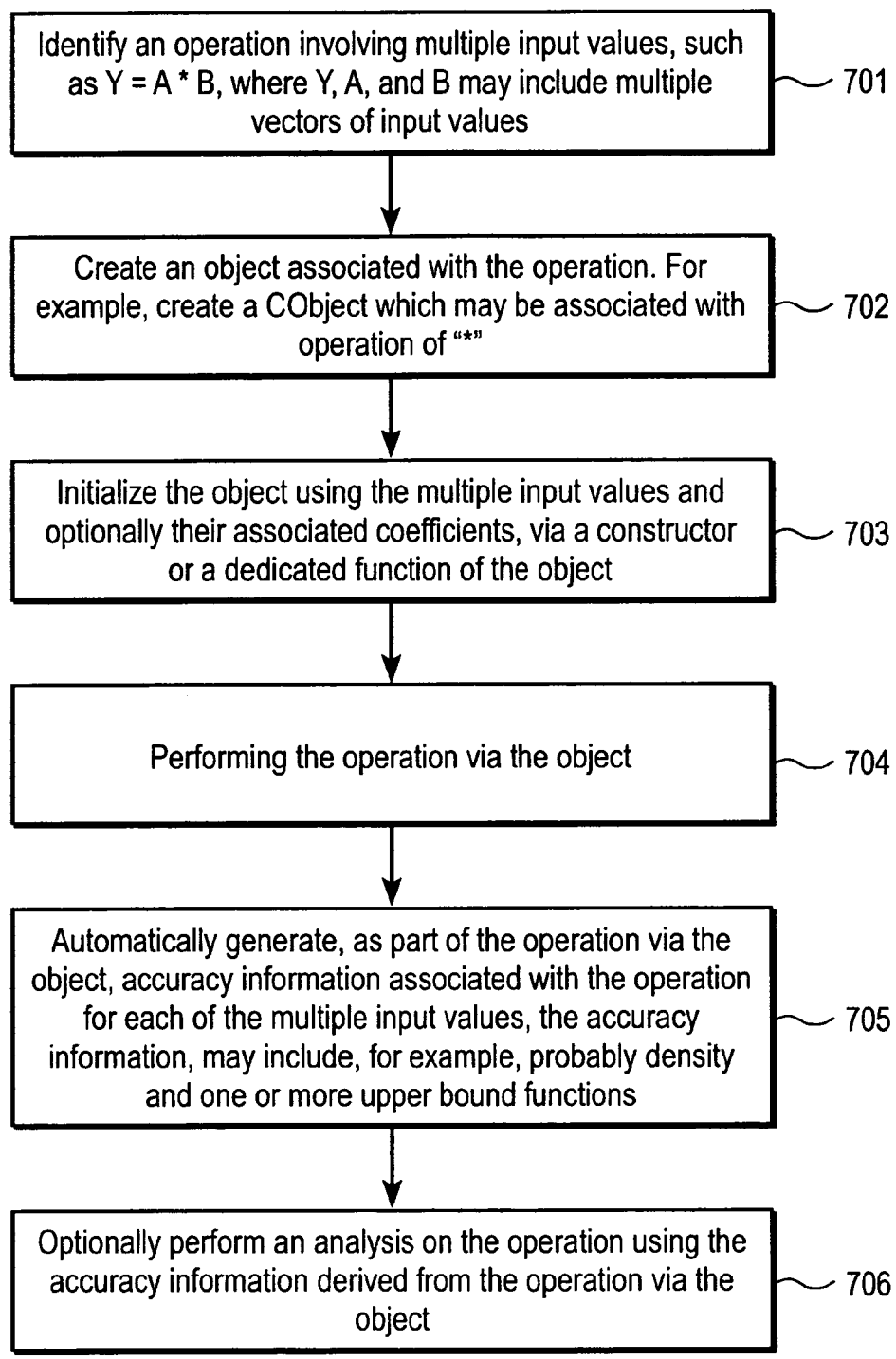
FIG. 7 is a flow diagram illustrating an embodiment of an exemplary process for error measurements.

FIG. 7 is a flow diagram illustrating an exemplary process for automatically computing accuracy information associated with an operation, according to one embodiment. Exemplary process 700 may be performed by a processing logic that may comprise hardware (circuitry, dedicated logic, etc.), software (such as is run on a general purpose computer system or a dedicated machine), or a combination of both. In one embodiment, exemplary process 700 includes identifying an operation involving a plurality of input values, invoking an object associated with the identified operation, performing the operation via the invoked object, and automatically generating, as a part of the operation via the object, accuracy information associated with the operation for each of the plurality of input values.

Referring to FIG. 7, at block 701, an operation is identified which may involve multiple input values, such as Y=A*B, where A and B may include multiple vectors of input values. At block 702, an object associated with the identified operation is created. At block 703, the object is initialized using the multiple input values and optionally the associated coefficients, via a constructor or a dedicated function of the object. At block 704, the operation is performed via the object. In addition, at block 705, the accuracy information regarding the operation is automatically generated, as a part of the operation, via the object. In one embodiment, the object is created and the operation is performed using object oriented techniques. In one embodiment, the accuracy information may include, for example, probability density and one or more upper bound functions.

At block 706, an analysis may be optionally performed using the accuracy information derived from the operation via the object.

Figure 8:
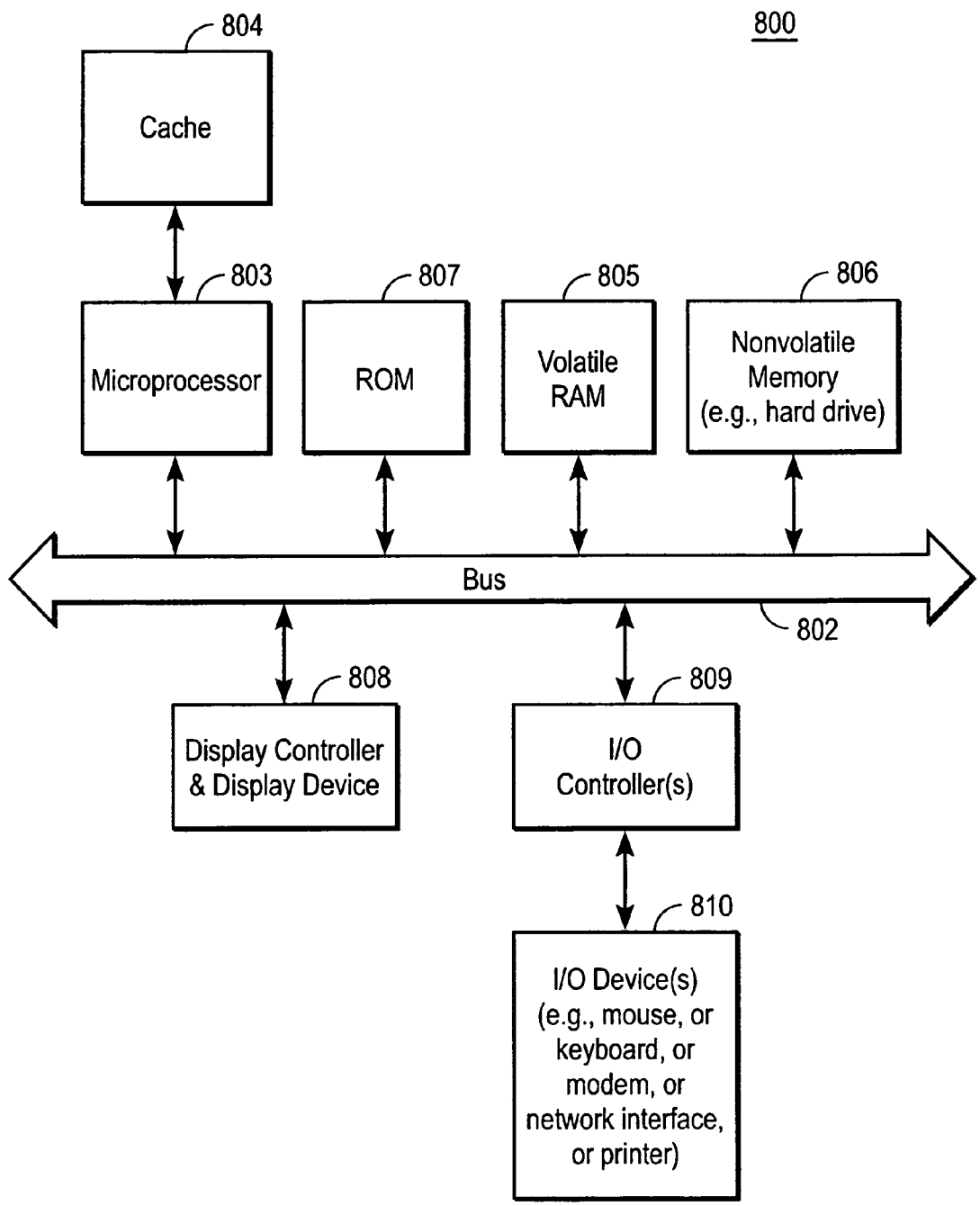
FIG. 8 is a block diagram illustrating an embodiment of an exemplary data processing system which may be used to perform error measurements.

FIG. 8 is a block diagram of an exemplary computer which may be used with an embodiment. For example, system 800 shown in FIG. 8 may perform the processes shown in FIGS. 2, 3, 4A–4D, and 7. In one embodiment, exemplary system 800 includes a processor, a memory coupled to the processor, and a process executed by the processor from the memory to cause the processor to identify an operation involving a plurality of input values, invoke an object associated with the identified operation, perform the operation via the invoked object, and automatically generate, as a part of the operation via the object, accuracy information associated with the operation for each of the plurality of input values.

Note that while FIG. 8 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 8, the computer system 800, which is a form of a data processing system, includes a bus 802 which is coupled to a microprocessor 803 and a ROM 807, a volatile RAM 805, and a non-volatile memory 806. The microprocessor 803, which may be a Pentium processor from Intel Corporation, is coupled to cache memory 804 as shown in the example of FIG. 8. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art. Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals.

Followings are exemplary source codes implemented in matlab, which is available by Mathworks, Inc. It will be appreciated that the instructions may be implemented in other object oriented programming languages, such as C/C++ language. The following instructions may be performed by processing logic that may comprise hardware (circuitry, dedicated logic, etc.), software (such as is run on a general purpose computer system or a dedicated machine), or a combination of both.

Following is an application that invokes an object under object oriented environment to perform error measurements.

```
%..The following instructions are implemented in matlab, however, the instructions may be
%..implemented in other object oriented programming languages, such as C/C++ language.
%..The following instructions may be performed by processing logic that may comprise
%..hardware (circuitry, dedicated logic, etc.), software (such as is run on a general purpose
%..computer system or a dedicated machine), or a combination of both.
clear;
x1 = ivar_spt( '32s', 1, -2^15, 2^15 - 1);
x2 = ivar_spt( '32s', 2, -2^15, 2^15 - 1);
x3 = ivar_spt( '32s', 3, -2^15, 2^15 - 1);
%...define three input variables, they have ID number 1, 2, 3
%...their ranges are all in [-2^15, 2^15 - 1] (16-bit signed integer range)
%...we denote that their underlying integer type is 32-bit signed (32s)
Q = 13
d1 = const_spt('32s', Q, cos(pi/7));
d2 = const_spt('32s', Q, cos(pi/5));
d3 = const_spt('32s', Q, cos(pi/12));
%...this defines some constants, the value is round-to-integer( 2^Q * cos(pi/7) ) for
%...example. These constants are scaled up version of the mathematical constants stated
%...Moreover, the program here will also calculate the error due to rounding and set up
%...the probability density function as needed.
y3=x1 + x2;
y4=d1*x3 + d2*x2;
y4 = align_by_rsh( y4, Q );
y5=y4 + align_by_rsh(d3*x3, Q);
%..these are the computation under test. Each of these operators "+" "*" are overloaded
%..it performs the simple operation as well as propagate those density functions and
%..upper bound functions.
display(y3,1);
display(y5,1);
%..this display function are simple routines that plot the details inside the objects y3, y5
%..it will for example, plot the probability density function of the data independent error
%..and plot the upper bound functions
```

Following is a program defining an object which is used by the above application.

```
%..The following instructions are implemented in matlab, however, the instructions may be
%..implemented in other object oriented programming languages, such as C/C++ language.
%..The following instructions may be performed by processing logic that may comprise
%..hardware (circuitry, dedicated logic, etc.), software (such as is run on a general purpose
%..computer system or a dedicated machine), or a combination of both.
function w = spt( varargin )
%
% This is the statistical prototype object spt.
% We model computed value as Y(x) = xi(x) + mu(x) + eps(x)
% Updated by tao, in order to fix three bugs
% 1. ubf counting dont consider the sign coef canceling of common components.
% 2. pdf counting dont consider the add/substract relation of common components,
%     rather than convolution
% 3. dont consider the difference of below/above zero region.
%
% The detailed representation is
% w.var_type       'const', 'ivar', 'dvar'(reserve)
%
% w.int_type       '16s', '32s', '64s'
%
% w.quanta         quanta (Q val)
%
% w.ivar_list      3-row integer list
%            first row is the ID list of indenpendent variable (data)
%               second row is the upper boundary list of ...
%            third row is the lowwer boundary list of ...
%
% w.Y              samples of values of this variable
%
% w.v              the ubf for Y, |Y| <= v(|x|) |x|
%                  1-row integer list contain the coef of corresponding independent
%                  variable's Y ubf function, the fundmental ubf function is the one_ubf.
%
% w.mu             the sample values of actual mu
%
% w.u              the ubf for mu: |mu(x)| <= u(|x|) |x|
%                  1-row integer list contain the coef of corresponding independent
%                  variable's mu ubf function, the fundmental ubf function is the one_ubf.
%
% w.eps            the smaple values of actual eps
%
% w.f_eps          the pdf of eps
%              when upper>lowwer, the pdf is uniform distribution.
% w.trail_zeros    number of trailing zeros.
%
switch nargin
case 0
% if no input arguments, create a default object
% as the zero constant in '32s' integer type, Q value 0.
   w = const_spt('32s',0,0);
case 1
% if single argument, check if this is already a single
% spt object. Otherwise, report error.
   if (isa(varargin{1},'spt'))
      w = varargin{1};
   else
      error('Wrong input type to spt creation');
   end
case 10
   w.var_type      = varargin{1};
   w.int_type      = varargin{2};
   w.quanta        = varargin{3};
   w.ivar_list     = varargin{4};
   w.Y        = varargin{5};
   w.v        = varargin{6};
   w.mu       = varargin{7};
   w.u        = varargin{8};
   w.eps      = varargin{9};
   w.f_eps         = varargin{10};
   w.trail_zeros       = 0;
   w = class(w,'spt');
```

-continued

```
case 11
    w.var_type      = varargin{1};
    w.int_type      = varargin{2};
    w.quanta        = varargin{3};
    w.ivar_list     = varargin{4};
    w.Y             = varargin{5};
    w.v             = varargin{6};
    w.mu            = varargin{7};
    w.u             = varargin{8};
    w.eps           = varargin{9};
    w.f_eps = varargin{10};
    w.trail_zeros   = varargin{11};
    w = class(w,'spt');
otherwise
    error('Wrong number of input arguments');
end
```

Following function defines an overloaded operator which may be used in the above object.

```
%..The following instructions are implemented in matlab, however, the instructions may be
%..implemented in other object oriented programming languages, such as C/C++ language.
%..The following instructions may be performed by processing logic that may comprise
%..hardware (circuitry, dedicated logic, etc.), software (such as is run on a general purpose
%..computer system or a dedicated machine), or a combination of both.
function c = mtimes( a, b )
%
% c = mtimes( a, b ) multiplies two SPT objects.
% var spt * var spt have not supported yet.
%
global DEBUG
if (~isa(a,'spt') | ~isa(b,'spt'))
    error('Error in * for SPT. Both inputs must be spt object');
end
if (~strcmp(a.var_type,'const') & ~strcmp(b.var_type,'const'))
    error('Error in * for SPT. Does not support variable*variable');
end
if ( strcmp(a.var_type,'const') )
    a_var_type      = a.var_type;
    a_int_type      = a.int_type;
    a_quanta        = a.quanta;
    a_ivar_list     = a.ivar_list;
    a_Y             = a.Y;
    a_v             = a.v;
    a_mu            = a.mu;
    a_u             = a.u;
    a_eps           = a.eps;
    a_f_eps         = a.f_eps;
    a_trail_zeros   = a.trail_zeros;
    b_var_type      = b.var_type;
    b_int_type      = b.int_type;
    b_quanta        = b.quanta;
    b_ivar_list     = b.ivar_list;
    b_Y             = b.Y;
    b_v             = b.v;
    b_mu            = b.mu;
    b_u             = b.u;
    b_eps           = b.eps;
    b_f_eps         = b.f_eps;
    b_trail_zeros   = b.trail_zeros;
else
    a_var_type      = b.var_type;
    a_int_type      = b.int_type;
```

Thus, method and apparatus for measuring accuracies of fixed-point computations have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:

identifying an operation involving a plurality of input values;

invoking an object associated with the identified operation, the object including a computational model as a member of the object to generate accuracy information for the operation, the computational model being defined by identifying a theoretical result of the operation based on an input value, defining an input independent error associated with the input value, defining an input dependent error associated with the input value, and obtaining an actual result of the operation based on the theoretical result, the input independent error, and input dependent error;

performing the operation via the invoked object; and automatically generating, as a part of the operation via the object, the accuracy information associated with the operation for each of the plurality of input values.

2. The method of claim 1, further comprising:

creating the object associated with the identified operation; and initializing the object using the plurality of input values prior to performing the operation.

3. The method of claim 2, further comprising receiving the plurality of input values as parts of parameters associated with the object when the object is created.

4. The method of claim 1, wherein the object comprises one or more member functions to perform the operation and to substantial concurrently generate the accuracy information associated with the operation.

5. The method of claim 1, further comprising defining a computational model, as a member of the object, to generate the accuracy information for the operation.

6. The method of claim 1, wherein the actual result of the operation is obtained via a summation of the theoretical result, the input independent error, and input dependent error.

7. The method of claim 1, wherein the computational model comprises one of a probability density function and one or more upper-bound functions representing the accuracy of the operation.

8. The method of claim 7, wherein the probability density function represents a probability density of the input independent errors.

9. The method of claim 7, wherein the one or more upper-bound functions comprise a first upper-bound function and a second upper-bound function, the first upper-bound function representing upper bound values associated with the input dependent errors and the second upper-bound function representing upper bound values associated with the actual results of the operation.

10. The method of claim 1, wherein the operation comprises one of an addition, a multiplication, and a shifting operation.

11. The method of claim 1, wherein the accuracy information includes differences between a theoretical result and an actual result of the operation.

12. The method of claim 1, wherein the plurality of input values comprises multi-dimensional vectors of values.

13. The method of claim 1, wherein the object is invoked via an inheritance of an object oriented programming (OOP) environment.

14. The method of claim 13, further comprising overloading an operator associated with the operation via the OOP environment, such that the accuracy information is obtained transparently with respect to the actual operation.

15. A machine-readable medium having executable code to cause a machine to perform a method, the method comprising:

identifying an operation involving a plurality of input values;

invoking an object associated with the identified operation, the object including a computational model as a member of the object to generate accuracy information for the operation, the computational model being defined by identifying a theoretical result of the operation based on an input value, defining an input independent error associated with the input value, defining an input dependent error associated with the input value, and obtaining an actual result of the operation based on the theoretical result, the input independent error, and input dependent error;

performing the operation via the invoked object; and automatically generating, as a part of the operation via the object, the accuracy information associated with the operation for each of the plurality of input values.

16. The machine-readable medium of claim 15, wherein the method further comprises defining a computational model, as a member of the object, to generate the accuracy information for the operation.

17. The machine-readable medium of claim 15, wherein the actual result of the operation is obtained via a summation of the theoretical result, the input independent error, and input dependent error.

18. The machine-readable medium of claim 15, wherein the computational model comprises one of a probability density function and one or more upper-bound functions representing the accuracy of the operation.

19. The machine-readable medium of claim 18, wherein the probability density function represents a probability density of the input independent errors.

20. The machine-readable medium of claim 18, wherein the one or more upper-bound functions comprise a first upper-bound function and a second upper-bound function, the first upper-bound function representing upper bound values associated with the input dependent errors and the second upper-bound function representing upper bound values associated with the actual results of the operation.

21. The machine-readable medium of claim 15, wherein the operation comprises one of an addition, a multiplication, and a shifting operation.

22. The machine-readable medium of claim 15, wherein the object is invoked via an inheritance of an object oriented programming (OOP) environment.

23. The machine-readable medium of claim 22, wherein the method further comprises overloading an operator associated with the operation via the OOP environment, such that the accuracy information is obtained transparently with respect to the actual operation.

24. A data processing system, comprising:

a processor;

a memory coupled to the processor; and a process executed by the processor from the memory to cause the processor to identify an operation involving a plurality of input values, invoke an object associated with the identified operation, the object including a computational model as a member of the object to generate accuracy information for the operation, the computational model being defined by identifying a theoretical result of the operation based on an input value, defining an input independent error associated with the input value, defining an input dependent error associated with the input value, and obtaining an actual result of the operation based on the theoretical result, the input independent error, and input dependent error, perform the operation via the invoked object, and automatically generate, as a part of the operation via the object, the accuracy information associated with the operation for each of the plurality of input values.

25. The data processing system of claim 24, wherein the process further causes the processor to define a computational model, as a member of the object, to generate the accuracy information for the operation.

26. A data processing system, comprising:

a processor;

a memory coupled to the processor; and a process executed by the processor from the memory to cause the processor to identify an operation involving a plurality of input values, invoke an object associated with the identified operation, the object including a computational model as a member of the object to generate accuracy information for the operation, perform the operation via the invoked object, and automatically generate, as a part of the operation via the object, the accuracy information associated with the operation for each of the plurality of input values, wherein the computational model comprises one of a probability density function and one or more upper-bound functions representing the accuracy of the operation.

27. The data processing system of claim 26, wherein the probability density function represents a probability density of the input independent errors, and wherein the one or more upper-bound functions comprise a first upper-bound function and a second upper-bound function, the first upper-bound function representing upper bound values associated with the input dependent errors and the second upper-bound function representing upper bound values associated with the actual results of the operation.

* * * * *